Sept. 29, 1936.  J. A. PERRY  2,055,801
FLUSHING APPARATUS
Filed July 20, 1935  2 Sheets-Sheet 2
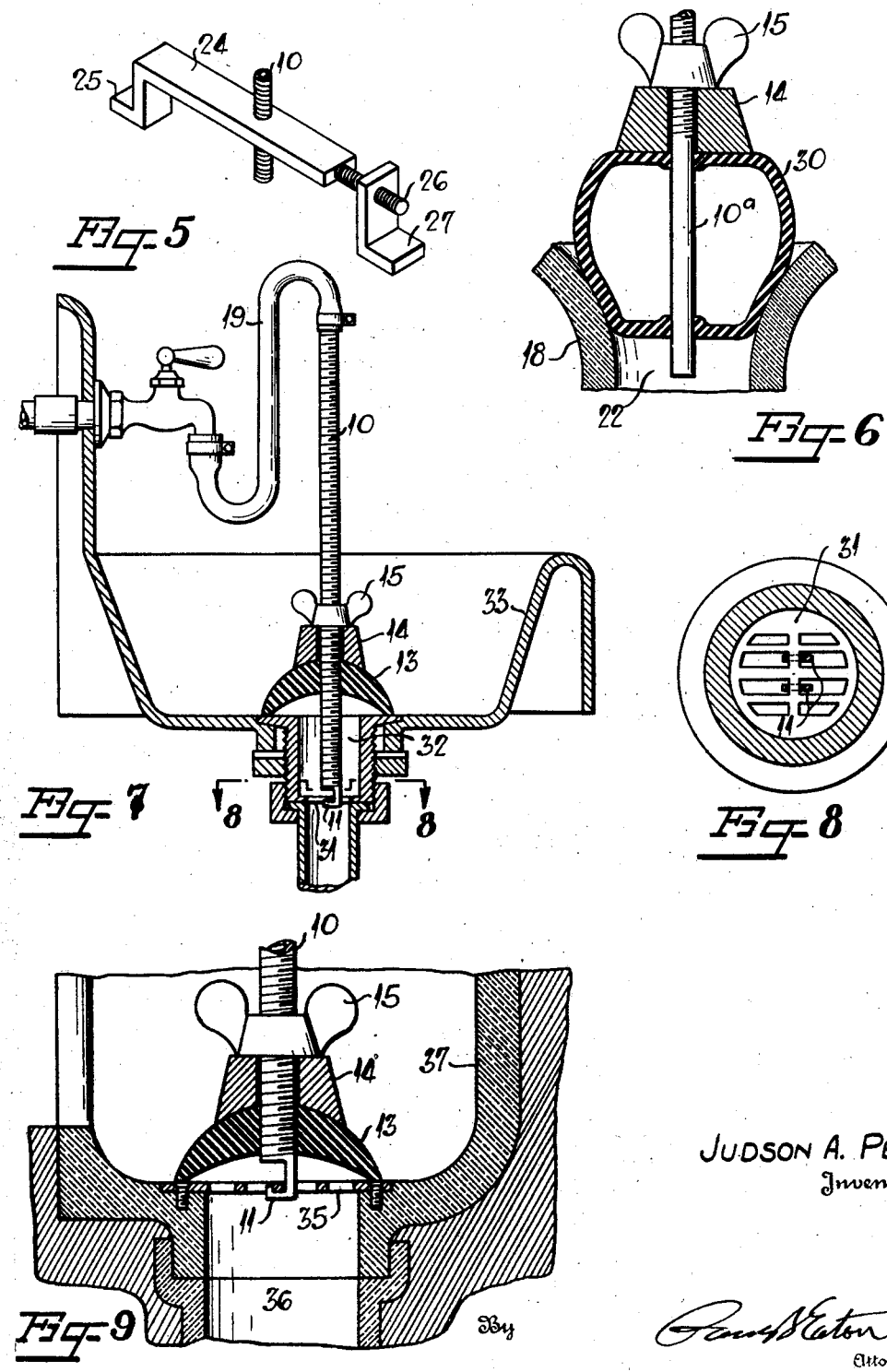
Judson A. Perry
Inventor Patented Sept. 29, 1936

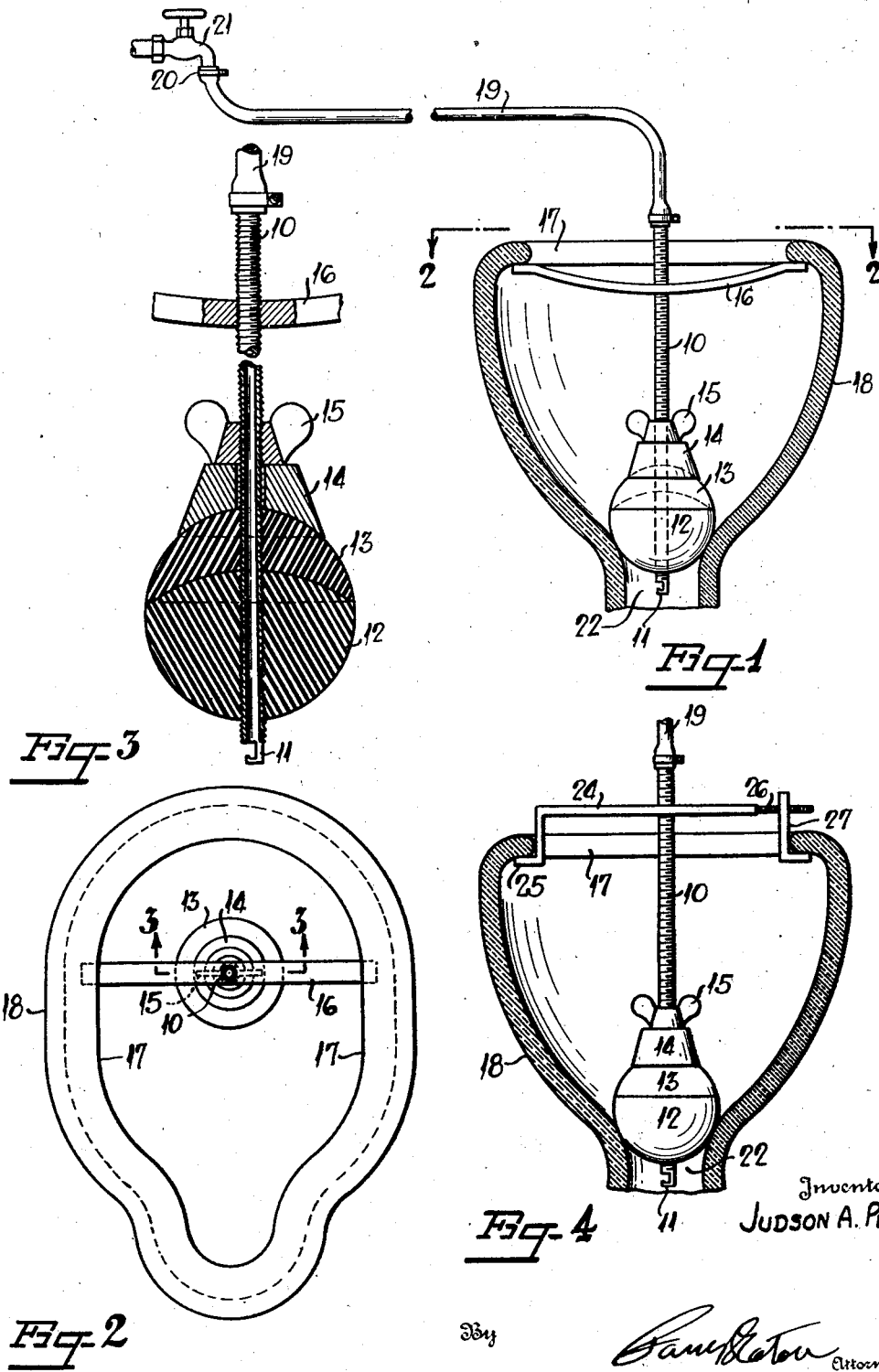

2,055,801

UNITED STATES PATENT OFFICE 2,055,801

FLUSHING APPARATUS

Judson A. Perry, Greensboro, N. C., assignor to George L. Bason, Greensboro, N. C.

Application July 20, 1935, Serial No. 32,414

6 Claims. (Cl. 4—257)

This invention relates to apparatus designed for use in removing obstructions from drain pipes leading from commodes, sinks, lavatories, latrines and the like, and comprises means adapted to be fitted to any of the above mentioned devices and also having means whereby the same can be connected to a source of water under pressure so that water under pressure can be forced into the outlet of discharge pipes of said devices to force the obstruction therefrom.

It is an object of this invention to provide a device adapted to be used for flushing stopped-up outlets to sinks, commodes, latrines, lavatories and the like, comprising a threaded pipe having resilient means on the lower end thereof and also having means for securing the pipe and resilient means in position over a discharge outlet from any of the above mentioned devices together with means for connecting the apparatus to a source of water under pressure so that water may be forced through the discharge or outlet pipe to remove stoppages and obstructions therein.

It is another object of this invention to provide apparatus adapted to be affixed within or pressed against the discharge outlet of commodes, sinks, lavatories, latrines and the like, so that a source of water pressure can be connected to the discharge outlet to force water through the discharge outlet to remove obstructions therefrom.

Some of the objects of the invention having been stated, other objects will appear as the description proceeds when taken in connection with the accompanying drawings, in which:—

Figure 1 is an elevation of the apparatus showing the same installed in a commode which is shown in section;

Figure 2 is a top plan view with portions thereof in section and being taken along line 2—2 in Figure 1;

Figure 3 is a vertical sectional view taken along line 3—3 in Figure 2;

Figure 4 is a view similar to Figure 1 but showing a modified means for securing the apparatus in position;

Figure 5 is an isometric view of the upper portion of the apparatus shown in Figure 4;

Figure 6 is a vertical sectional view showing a modified form of the apparatus on the lower end of the device;

Figure 7 is a vertical sectional view through a sink and showing the apparatus installed therein;

Figure 8 is a transverse sectional view taken along line 8—8 in Figure 7;

Figure 9 is a vertical sectional view through the lower portion of a latrine and showing the apparatus installed therein.

Referring more specifically to the drawings, the numeral 10 indicates a threaded pipe having a hook 11 on the lower end thereof and having resilient members 12 and 13 tightly secured thereon, said members 12 and 13 being preferably composed of moderately soft rubber. Disposed immediately above member 13 and loosely mounted around pipe 10 is a washer 14 and immediately thereabove is a wing nut 15 threadably secured on pipe 10 for adjusting the position of members 12 and 13.

Disposed above the wing nut 15 at a suitable distance to accommodate the apparatus to the particular device being flushed, is an elongated wing nut 16 which has its arms extending outwardly far enough to engage the lower edge of the upper rim portion 17 of a commode 18. Secured to the upper end of pipe 10 is a rubber hose 19 which is adapted to be secured as at 20 to any suitable source of water pressure such as a spigot 21 connected to the conventional city water pressure or any water supply system.

The apparatus is adapted to be installed in the position shown in Figure 1 by first adjusting the long wing nut 16 to the desired position and then pressing the apparatus into the discharge outlet 22 of the commode 18 and with the wing nut being turned at right angles to the position shown in Figure 2, it can be turned 90 degrees and pressed underneath the rim portion 17 in the position shown in Figures 1 and 2.

In Figure 4 like reference characters apply to parts as shown in Figures 1 to 3, and the only difference in the structure shown in Figure 4 is the different mode of securing the apparatus into position. Instead of having the wing nut in the shape shown in Figure 1, a different type of wing nut 24 is provided having a hooked portion 25 on one end and having a threaded projection 26 on the other end around which is adapted to be adjustably secured a hook member 27 having a hole therethrough threaded for receiving the threaded portion 26.

With the part 24 being adjusted in the proper position, the apparatus can be hooked beneath the rim portion 17 of the commode by turning the same approximately 90 degrees from the position in which it is inserted into the apparatus, that is, it can be inserted with one end of the member 24 pointed towards the front of the commode which has the longest dimension and then turned 90 degrees to the position shown in Figure 2.

As shown in Figure 4, the hook 25 and the hooked portion 27 will engage beneath the rim 17 of the commode and hold the resilient member 12 in position in the discharge outlet 22 to secure a stopper to said outlet so that water pressure can be built up therebelow when water is conducted through hose 19.

In Figure 6 a slightly modified form of the invention is shown as to the lower end thereof. Instead of having two solid rubber members 12 and 13, a suitable hollow rubber ball 30 can be provided to tightly but slidably fit on the pipe 10a as this pipe is identical to pipe 10 except that it has no hook on its lower end and is not threaded at the point where the ball 30 fits thereon, but the ball has a tight fit on the pipe 10a.

In Figure 7 the invention is shown as being fitted to the discharge outlet of a sink. Here, the parts above described are identical, except that the portion 12 is eliminated and the nut 15 and washer 14 and portion 13 are moved downwardly to the proper position on the pipe 10 and the hook 11 is engaged in spider member 31 in the discharge outlet 32 of the sink 33. Thus, it is seen that by moving the nut 15 downwardly, pressure can be applied to the member 13 to securely force it against the discharge outlet 32 as the hook 11 will be in engagement with spider member 31 and thus no external support is required.

In Figure 9, the apparatus as shown in Figure 7, is secured to the discharge outlet plate 35 disposed in discharge outlet 36 of a latrine 37. Here the portions 13 and 14 are moved farther downwardly on pipe 10 by adjustment of nut 15 after the hook 11 has engaged the spider member 35.

It is thus seen that I have provided a flushing apparatus adapted to be secured to practically any type of plumbing fixture with the elimination of certain parts for certain apparatus. This makes a universal flushing apparatus for plumbing fixtures in general, which is self-contained and not subject to the losing of parts and reconstruction as all of the parts are self-contained and a complete flushing outfit is provided for whatever type of plumbing installation which may be desired to be flushed.

In the drawings and specification, there has been set forth a preferred embodiment of the invention, and although specific terms are employed, they are used in a generic sense only, and not for purposes of limitation, the scope of the invention being set forth in the appended claims.

I claim:

1. Apparatus for forcing water under pressure through the outlet pipe of a commode comprising a pipe threaded on its exterior, a rubber member adjustably secured immediately above the lower end of the pipe, an elongated nut threadably secured on the upper portion of the pipe and having its ends adapted to engage beneath the rim portion of the commode to securely hold the rubber member in the outlet, and a hose secured to the upper end of the pipe and adapted to be connected to a source of water under pressure.

2. Apparatus for forcing water under pressure through the outlet pipe of a sink, lavatory and the like comprising a pipe threaded on its exterior, a rubber member threadably secured around the pipe and near the lower end thereof, means for adjusting the position of said rubber member with relation to the lower end of the threaded pipe, said threaded pipe having a hook on the lower end thereof for engaging a portion of the outlet pipe and whereby when the rubber member is adjusted the outlet pipe will be closed at its upper end and above the lower end of the threaded pipe, and means for connecting the upper end of said threaded pipe to a source of water under pressure.

3. Apparatus for forcing water pressure through the outlet pipes for sinks, lavatories, commodes and the like comprising a pipe threaded on its exterior, a resilient member adjustably and threadably mounted on the lower end of the pipe, a nut disposed above the resilient member on said pipe to hold the resilient member in adjusted position, a hook on the lower end of said pipe for engaging a portion of the outlet pipe to hold the resilient member in position to close said outlet pipe at a point above the lower end of the pipe, and means for forcing water through said pipe and through said outlet pipe.

4. Apparatus for flushing outlet pipes for plumbing fixtures comprising a pipe threaded on its exterior, a resilient member adjustably and threadably secured on the lower end of the pipe and adapted to fit over said outlet pipe to close the same at a point above the lower end of said pipe, means on the pipe for engaging said plumbing fixture to hold the apparatus in position, and means whereby water under pressure can be conducted through said pipe and through said outlet pipe.

5. Apparatus for forcing water under pressure through the discharge outlets of sinks, commodes, lavatories and the like comprising a hollow pipe threaded on its exterior, a resilient member threadably and adjustably secured on the lower end of the pipe, and means for securing the apparatus in position to close said outlet.

6. Apparatus for forcing water under pressure through the outlet pipes for sinks, commodes and the like comprising a pipe threaded on its exterior, a resilient member threadably mounted on the lower portion of the pipe, a nut disposed on said pipe above said resilient member for holding said resilient member in adjusted position with relation to the pipe, the upper end of said pipe being adapted to be connected to a source of water under pressure.

JUDSON A. PERRY.